United States Patent
Chang (10) Patent No.: US 10,086,267 B2
(45) Date of Patent: Oct. 2, 2018

(54) PHYSICAL GESTURE INPUT CONFIGURATION FOR INTERACTIVE SOFTWARE AND VIDEO GAMES

(71) Applicant: Microsoft Technology Licensing, LLC, Redmond, WA (US)

(72) Inventor: Ken Huagang Chang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/235,727

(22) Filed: Aug. 12, 2016

(65) Prior Publication Data
US 2018/0043246 A1    Feb. 15, 2018

(51) Int. Cl.
| A63F 13/213 | (2014.01) |
| G06F 3/00 | (2006.01) |
| G06F 3/01 | (2006.01) |
| G06F 3/03 | (2006.01) |
| G06F 3/16 | (2006.01) |
| G06T 19/00 | (2011.01) |
| A63F 13/214 | (2014.01) |
| A63F 13/28 | (2014.01) |
| A63F 13/42 | (2014.01) |

(52) U.S. Cl.
CPC .......... *A63F 13/213* (2014.09); *A63F 13/214* (2014.09); *A63F 13/28* (2014.09); *A63F 13/42* (2014.09); *G06F 3/005* (2013.01); *G06F 3/017* (2013.01); *G06F 3/03* (2013.01); *G06F 3/167* (2013.01); *G06T 19/006* (2013.01); *A63F 2300/1087* (2013.01); *A63F 2300/8082* (2013.01)

(58) Field of Classification Search
CPC ...... A63F 13/213; A63F 13/42; A63F 13/428; A63F 2300/1093; A63F 2300/6045; G06F 3/011; G06F 3/017
See application file for complete search history.

(56) References Cited

U.S. PATENT DOCUMENTS

| 5,896,125 A | 4/1999 | Niedzwiecki |
| 6,071,194 A | 6/2000 | Sanderson et al. |
| 6,203,432 B1 | 3/2001 | Roberts et al. |
| 8,845,424 B2 | 9/2014 | Sobel et al. |
| 2007/0051792 A1 | 3/2007 | Wheeler et al. |

(Continued)

OTHER PUBLICATIONS

Torok, et al., "A Mobile Game Controller Adapted to the Gameplay and User's Behavior Using Machine Learning", In Proceedings of 14th International Conference on Entertainment Computing, Sep. 29, 2015, 5 pages.

(Continued)

*Primary Examiner* — Lawrence Galka
(74) *Attorney, Agent, or Firm* — Klarquist Sparkman, LLP (57) ABSTRACT

Technologies are described for configuring user input using physical gestures. For example, a user can be prompted to perform a physical gesture to assign to a software application command (e.g., an action within a video game or a command in another type of application). In response, a physical gesture can be received from the user via a physical gesture input device. The received physical gesture can then be associated with the software application command so that when the user performs the physical gesture the software application command can be initiated.

19 Claims, 6 Drawing Sheets

(56) References Cited

U.S. PATENT DOCUMENTS

| | | | |
|---|---|---|---|
| 2008/0004113 A1 | 1/2008 | Avery et al. | |
| 2008/0160492 A1 | 7/2008 | Campbell et al. | |
| 2010/0199229 A1* | 8/2010 | Kipman | G06F 3/017 |
| | | | 715/863 |
| 2011/0007079 A1* | 1/2011 | Perez | G06F 3/011 |
| | | | 345/473 |
| 2011/0136568 A1 | 6/2011 | Buhr | |
| 2013/0263054 A1* | 10/2013 | Lee | G06F 3/04817 |
| | | | 715/835 |
| 2015/0091708 A1 | 4/2015 | Tan et al. | |
| 2016/0299570 A1* | 10/2016 | Davydov | G06F 1/163 |
| 2017/0151498 A1* | 6/2017 | Soelberg | A63F 13/428 |

OTHER PUBLICATIONS

"How to Map Keys on Any App on the BlueStacks App Player", Published on: Jul. 31, 2015, Available at: http://support.bluestacks.com/hc/en-us/articles/204194239-How-to-map-keys-on-any-app-on-the-BlueStacks-App-player-.

"Handling Controller Actions", Published on: Mar. 2, 2014, Available at: http://developer.android.com/training/game-controllers/controller-input.html.

* cited by examiner

SOFTWARE 580 IMPLEMENTING DESCRIBED TECHNOLOGIES

PHYSICAL GESTURE INPUT CONFIGURATION FOR INTERACTIVE SOFTWARE AND VIDEO GAMES

BACKGROUND

Configuring an input device for use with a software application can be a difficult task. Some solutions use pre-defined input device configurations. For example, a software application may come with pre-defined keyboard keys and mouse inputs associated with the various actions that the software application can perform (e.g., word processing commands for a word processing application, photo editing commands for a photo editing application, or video game actions for a video game). A pre-defined configuration can be sufficient in some situations, but has a number of limitations. For example, a pre-defined configuration may not allow the user to change the configuration, and the pre-defined configuration may not be intuitive to the user.

Other solutions provide some customization of the input device configuration. For example, the user may be able to assign specific keys to perform specific commands within the software application. However, such solutions may not allow the user to configure the input in the manner that the user desires or in the manner which is most efficient for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for configuring user input using physical gestures. For example, a user can be prompted to perform a physical gesture to assign to a software application command (e.g., an action within a video game or a command in another type of application). In response, a physical gesture can be received from the user via a physical gesture input device. The received physical gesture can then be associated with the software application command so that when the user performs the physical gesture the software application command will be initiated.

DETAILED DESCRIPTION

Overview

Various technologies are described for configuring user input using physical gestures. For example, a user can be prompted to perform a physical gesture to assign to a software application command (e.g., an action within a video game or a command in another type of application). In response, a physical gesture can be received from the user via a physical gesture input device. The received physical gesture can then be associated with the software application command so that when the user performs the physical gesture the software application command can be initiated.

A physical gesture is a representation of a movement of the user in three-dimensional space. For example, the movement can be a movement of the user's fingers, hand, arm, and/or other parts of the user's body. A physical gesture can represent the movement of the user using a skeletal model (e.g., captured using three-dimensional depth and/or color cameras), motion tracking, or using another technique. For example, a specific physical gesture can be when the user moves the user's right hand forward, makes a fist, and then moves the right hand backward.

When prompted to perform a physical gesture to assign to a software application command, the user can perform any desired movement to use as the physical gesture. In this way, the user can perform a movement in three-dimensional space that is intuitive to the user (e.g., based on the user's muscle memory). This also means that the user is not limited to a particular pre-defined movement for the physical gesture. For example, if the user is prompted to perform a physical gesture to zoom in on a weapon scope in a video game, the user is not prompted to, or required to, perform a specific per-defined movement, and instead the user can perform any desired movement. In addition, because the user can perform any desired movement, different users may perform different movements and thus have different physical gestures for initiating the same software application command. Therefore, a given user's physical gesture, and corresponding movement, is specific to the given user (the physical gesture it is user-specific).

Physical gestures can be assigned to a software application command so that performance of the physical gesture initiates the software application command. A software application command is a command in a software application that can be assigned to a user input using a standard input device (e.g., a mouse, a keyboard, a touch device, or a game controller). Using the technologies described herein, the software application command can be associated with a physical gesture (e.g., in addition to, or instead of, assigned to user input via a standard input device). For example, a data visualization application may have software application commands for zooming in, zooming out, rotating, etc. These software application commands may be assigned (e.g., by default) to specific keyboard keys or mouse controls. Using the technologies described herein, these software application commands can be associated with, and initiated by, physical gestures. As another example, a video game may have video game commands for performing actions such as shooting a weapon, reloading a weapon, zooming in and out on a weapon scope, throwing a grenade, looking in various directions, turning a steering wheel, controlling artificial intelligence teammates, controlling a flight stick, etc. These video game commands may be assigned (e.g., by default) to specific keyboard keys, mouse controls, or game controller inputs. Using the technologies described herein, these software application commands can be associated with, and initiated by, physical gestures.

A physical gesture input device refers to a device capable capturing or determining a physical gesture performed by a user. In some implementations, a physical gesture input device uses one or more digital cameras that capture the user's movements (e.g., the movement of the user's body or a portion of the user's body, such as the user's hands). One type of physical gesture input device is a device that uses one or more depth cameras to view the user and capture the user's movements. An example of a depth camera system is the Kinect® system provided by Microsoft Corporation®. Other types of physical gesture input devices do not use cameras. For example, a motion sensing device (e.g., a wearable or hand-held device) that can track the user's movements in three-dimensional space can also capture a physical gesture performed by the user.

A physical gesture input device may be integrated with another type of computing device. For example, a computer, gaming console, smart phone, or another type of computing device may have an integrated physical gesture input device (e.g., integrated depth cameras and associated hardware and/or software for receiving physical gestures). A physical gesture input device may be a separate device. For example, a computer, gaming console, smart phone, or another type of computing device can access (e.g., via a wired or wireless data connection) a separate physical gesture input device. Receiving and processing physical gestures can be performed by the physical gesture input device alone or in combination with an associated computing device.

In previous solutions for configuring user input, users have been instructed to perform specific actions, as a pre-defined configuration, with standard input devices, such as keyboards, mice, and game controllers. For example, a video game can instruct a user to press a specific keyboard key or game controller button to jump, fire, or move in a particular direction (e.g., the user could be instructed to press the "A" button on the game controller to cause the user's avatar in the game to jump). In other solutions, a video game can provide a settings menu where the user can assign specific inputs (e.g., keyboard keys, mouse buttons, or game controller actions) to perform specific actions (e.g., allowing the user to customize the input settings).

While such previous solutions allow some customization of input settings, they suffer from a number of limitations. For example, a pre-defined configuration may not allow the user to change the configuration, and the pre-defined configuration may not be intuitive to the user. In addition, the use of settings menus where the user can configure standard input devices may not allow the user to configure the input in the manner that the user desires or in the manner which is most efficient for the user. Therefore, these previous solutions can result in input errors, reduced efficiency, and difficulty using the software.

The technologies described herein for configuring user input using physical gestures provide improvements in terms of user experience, accuracy, efficiency, flexibility, and customization. For example, a user can be prompted to perform a physical gesture to assign to an identified command (e.g., a video game action or a command in another type of application). The user can then perform any desired physical gesture to create a physical gesture that is specific to the user for associating with the identified command. Then, when the user performs the physical gesture, the command can be initiated. Allowing the user to perform any desired physical gesture provides an improved user experience and can increase the ability of the user to remember and accurately reproduce the physical gesture. For example, if the user is asked to perform a physical gesture to zoom in on a weapon scope, the user may raise the user's arms, relying on the user's muscle memory. Because the user can use the user's muscle memory and/or past experience, the user is more likely to be able to remember and accurately repeat the physical gesture when the user needs to initiate the software application command.

Example Environments for Configuring Input Using Physical Gestures

In the technologies described herein, user input can be configured to use physical gestures. For example, a user can be prompted to perform a physical gesture to assign to a software application command (e.g., an action within a video game or a command in another type of application). In response, a physical gesture can be received from the user via a physical gesture input device. The physical gesture represents any desired movement of the user within a three-dimensional space. The received physical gesture can then be associated with the software application command so that when the user performs the physical gesture the software application command can be initiated.

Various environments can be provided allowing the user to configure input using physical gestures and to perform physical gestures for initiating software application commands. For example, the user can configure and utilize physical gestures while using a computing device such as a desktop computer, laptop computer, gaming console, or another type of computing device in association with a built-in or separate physical gesture input device.

The environment can support configuration of physical gestures for use in controlling software applications. The software applications can run on a display (e.g., a computer display or television) or within a virtual environment (e.g., an augmented reality (AR) environment or a virtual reality (VR) environment).

Figure 1A:
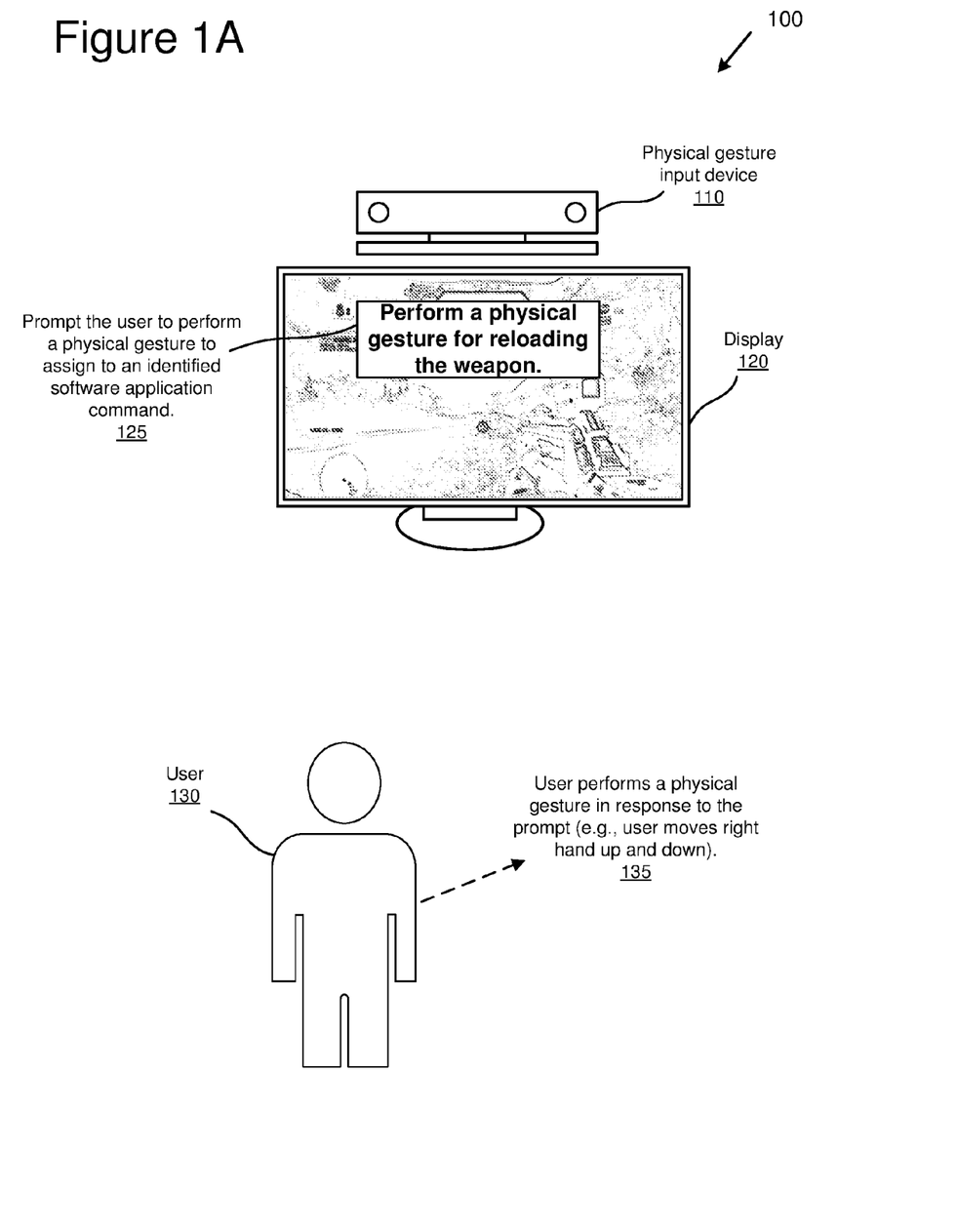
FIGS. 1A and 1B are diagrams depicting an example environment for configuring user input using physical gestures.

FIG. 1A is a diagram 100 depicting an example environment for configuring user input using physical gestures. The environment includes a physical gesture input device 110, a display 120, and a user 130. The specific type of physical gesture input device 110 depicted in the environment is a device that uses depth cameras to monitor the user's movements in three-dimensional space. However, in other environments, other types of physical gesture input devices can be used. They display 120 and physical gesture input device 110 are operated by a computing device (e.g., a computer, gaming console, or another type of computing device), which is not depicted.

The display 120 (e.g., a computer monitor or television) displays information from a software application (e.g., a video game, a data visualization program, or another type of software application). In other environments, different types of displays are used (e.g., virtual reality or augmented reality display systems).

As depicted in the environment, the display 120 is displaying content from a video game to the user 130. While displaying the video game (e.g., during a setup process or during an in-game tutorial) the user is prompted to perform a physical gesture to assign to an identified software application command, as depicted at 125. The prompt may be in the form of a visual message (e.g., text and/or graphics) and/or an audible message. In the specific example depicted on the display 120, the user 130 is prompted to perform a physical gesture for reloading a weapon in the video game. In addition, the prompt does not tell the user 130 which movement to use as the user 130 is not required to perform any specific pre-defined movement. Instead, the user 130 is free to choose any movement the user 130 desires.

In response to the prompt, the user 130 performs a physical gesture, as depicted at 135. For example, the user 130 can move the user's right hand up and down, which is then received by the physical gesture input device 110 and associated with the software application command and the user 130 (e.g., saved within a configuration profile of the video game along with a user identifier). When the user 130 later moves the user's right hand up and down (which is detected by the physical gesture input device 110), the software application command will be initiated (e.g., the weapon in the video game will be reloaded).

Figure 1B:
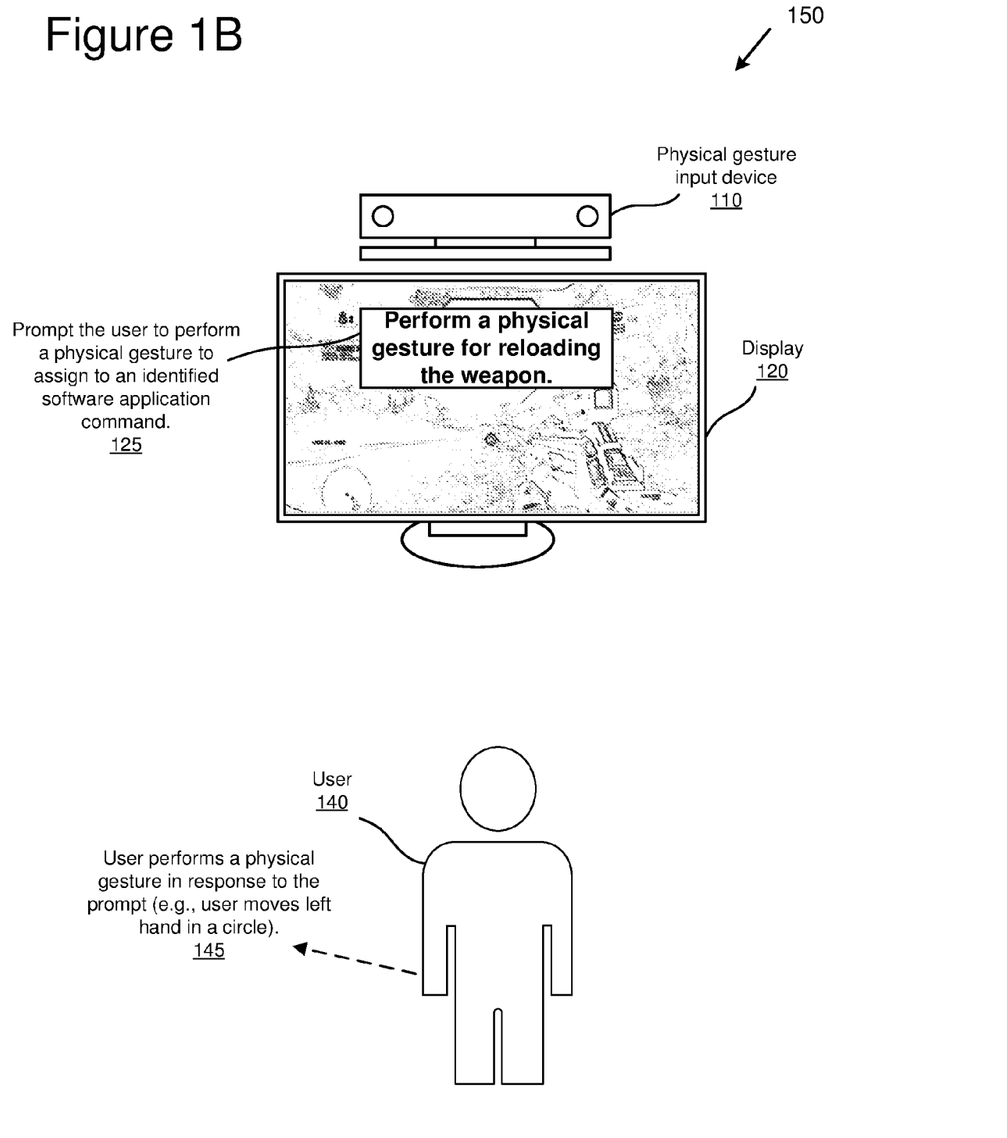

FIG. 1B is a diagram 150 depicting the same example environment depicted in FIG. 1A except that a different user 140 has been prompted to perform a physical gesture to assign to the same identified software application command (to perform a physical gesture for reloading the weapon). In response to the prompt, the user 140 performs a physical gesture, as depicted at 145. For example, the user 140 can move the user's left hand in a circle, which is then received by the physical gesture input device 110 and associated with the software application command (e.g., saved within a configuration profile of the video game along with a user identifier). When the user 140 later moves the user's left hand in a circle (which is detected by the physical gesture input device 110), the software application command will be initiated (e.g., the weapon in the video game will be reloaded).

As illustrated by FIGS. 1A and 1B, different users can configure and use different gestures to initiate the same software application command.

Example Methods for Configuring Input Using Physical Gestures

In the technologies described herein, methods can be provided for configuring user input using physical gestures. For example, a user can be prompted to perform a physical gesture for assigning to an identified software application command and in response a physical gesture can be received from the use via a physical gesture input device and assigned to the software application command.

Figure 2:
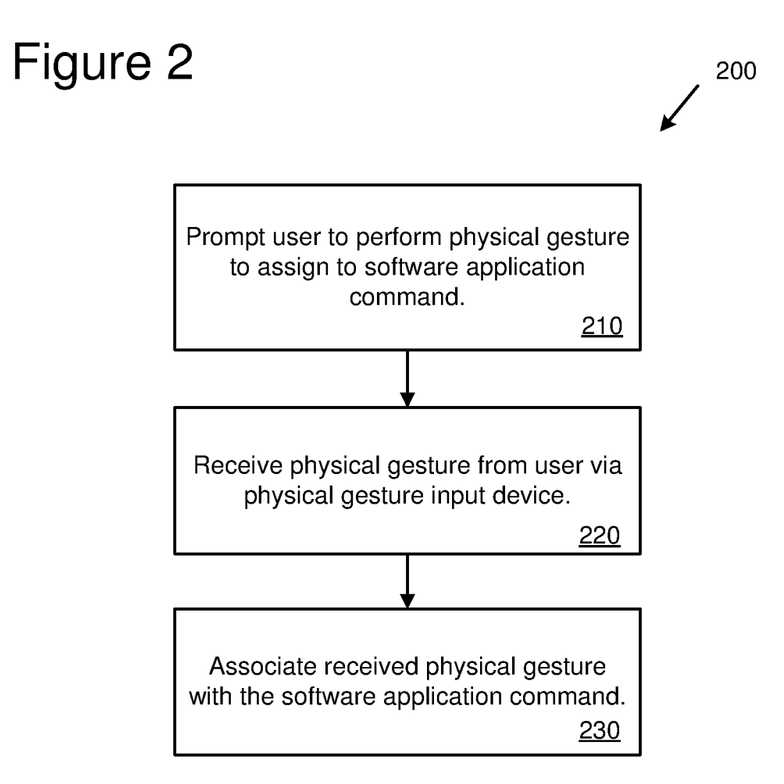
FIG. 2 is a diagram depicting an example method for configuring user input using physical gestures for software application commands.

FIG. 2 is a flowchart of an example method 200 for configuring user input using physical gestures for software application commands. At 210, the user is prompted to perform a physical gesture to assign to an identified software application command. The prompt can take the form of visual instructions (e.g., displayed text and/or graphics) and/or audible instructions.

At 220, in response to the prompt, a physical gesture is received from the use via a physical gesture input device. The physical gesture is a representation of a movement of the user in three-dimensional space. The movement can be any desired movement of the user and is not restricted to a specific pre-defined movement.

At 230, the physical gesture received at 220 is associated with the software application command. The physical gesture is also associated with the user so that when the user later performs the physical gesture, the software application command will be initiated.

In some implementations, the software application command is also assignable to a control input (e.g., a key press, mouse button press, controller input) from a standard input device, such as a mouse, keyboard, touch device, or game controller. For example, the software application command can be assigned to control input from a standard input device and/or to a physical gesture. In some implementations, the software application command is initially (e.g., by default) assigned to a control input for a standard input device (e.g., a specific keyboard key) and using one of the procedures described herein (e.g., the example method 200) the user reassigns the software application command to the physical gesture performed by the user.

In some implementations, the physical gesture is performed within a virtual environment (e.g., an AR or VR environment). For example, the software application command can perform an in-game action (e.g., controlling actions performed by the user's avatar in the video game) within an augmented reality environment or a virtual reality environment. An example of an augmented reality environment that uses a depth camera system as the physical gesture input device is the HoloLens™ system provided by Microsoft Corporation®.

Figure 3:
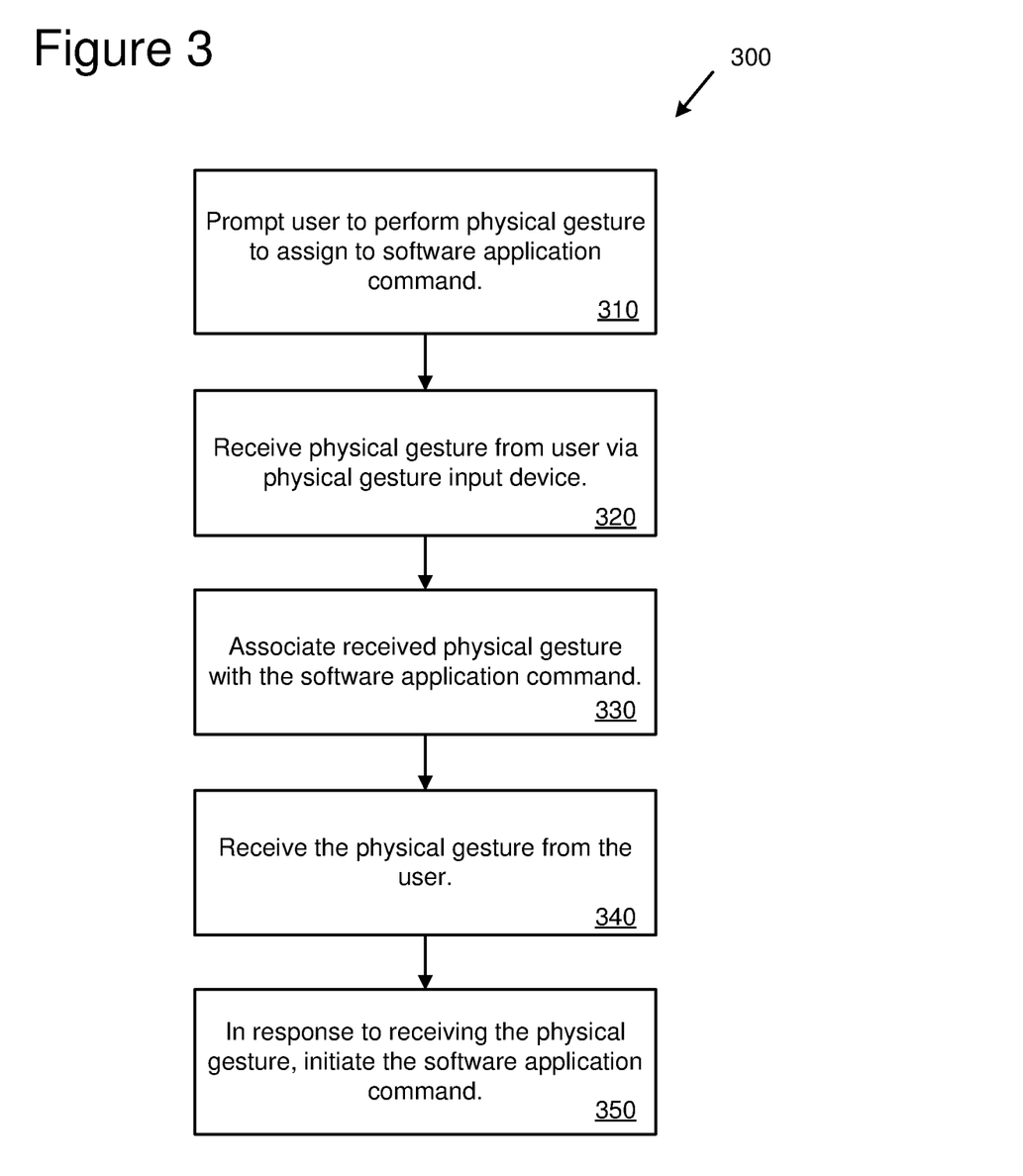
FIG. 3 is a diagram depicting an example method for configuring user input using physical gestures and initiating software application commands.

FIG. 3 is a flowchart of an example method 300 for configuring user input using physical gestures for software application commands. At 310, the user is prompted to perform a physical gesture to assign to an identified software application command. The prompt can take the form of visual instructions (e.g., displayed text and/or graphics) and/or audible instructions.

At 320, in response to the prompt, a physical gesture is received from the use via a physical gesture input device. The physical gesture is a representation of a movement of the user in three-dimensional space. The movement can be any desired movement of the user and is not restricted to a specific pre-defined movement.

At 330, the physical gesture received at 320 is associated with the software application command. The physical gesture is also associated with the user so that when the user later performs the physical gesture, the software application command will be initiated.

At 340, after the physical gesture has been received and associated, the physical gesture is received from the user. For example, the physical gesture is received while the user is using the software after the user completes a setup or tutorial. In response to the physical gesture received at 340, the software application command is initiated at 350. For example, the physical gesture received at 340 is compared with the physical gesture that was associated with the software application command (at 330). If they match (e.g., if they are substantially the same movement of the user such that they match within a variation threshold), then the software command is initiated (at 350). Otherwise, some other action can be taken (e.g., the user can be informed that the physical gesture is not recognized or the user can be asked to repeat the physical gesture).

Figure 4:
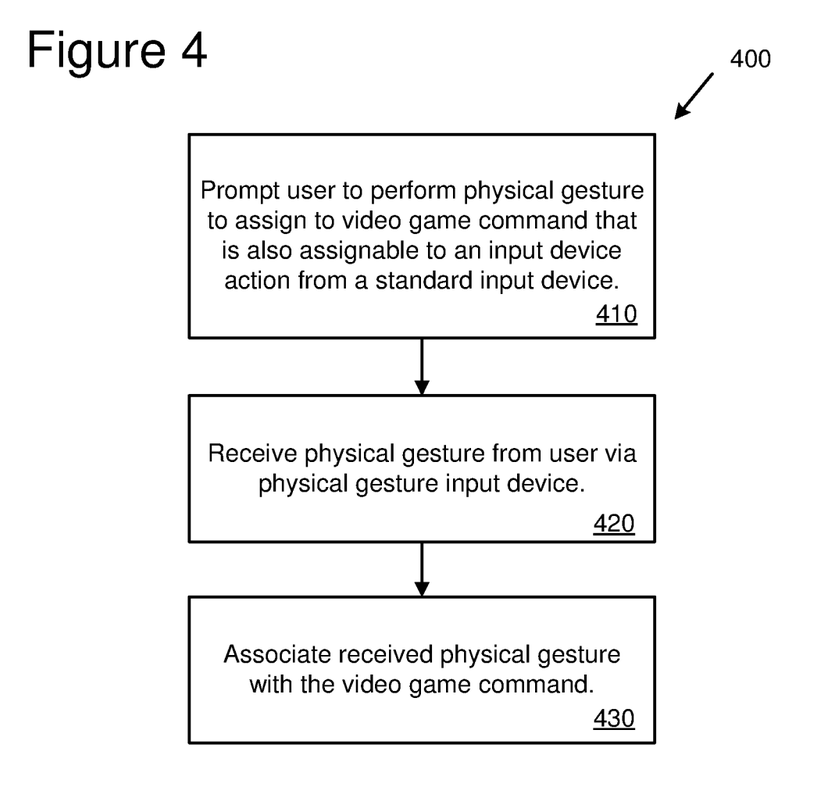
FIG. 4 is a diagram depicting an example method for configuring user input using physical gestures for video game commands.

FIG. 4 is a flowchart of an example method 400 for configuring user input using physical gestures for video game commands. At 410, the user is prompted to perform a physical gesture to assign to an identified video game command. The video game command is also assignable to an input device action from a standard input device. The prompt can take the form of visual instructions (e.g., displayed text and/or graphics) and/or audible instructions. For example, the user can be prompted (e.g., during an in-game tutorial) to perform a physical gesture for an identified video game command. In this way, physical gestures can be received from the user for each of a number of identified video game commands.

At 420, in response to the prompt, a physical gesture is received from the use via a physical gesture input device. The physical gesture is a representation of a movement of the user in three-dimensional space. The movement can be any desired movement of the user and is not restricted to a specific pre-defined movement.

At 430, the physical gesture received at 420 is associated with the video game command. When the user later performs the physical gesture, the video game command will be initiated.

In some implementations, the video game command is an in-game action performed by the user's avatar within a first-person or third-person video game environment. For example, the video game action can cause the user's avatar to fire a weapon, throw a grenade, move in a specific direction, etc. As another example, physical gestures can be used as control input in video games such as driving games (e.g., for looking and steering wheel turning) and flying games (e.g., third-person flight control input such as operating a virtual flight control stick).

In some implementations, physical gestures received from multiple users (e.g., by a cloud environment) are used to create default physical gestures. For example, physical gestures can be received from multiple users for performing the same software application command (e.g., the same video game command). The physical gestures can be analyzed to determine those that represent similar movements. For example, a subset of the physical gestures can be selected that are substantially similar (e.g., that represent substantially the same movements of the users such that they match within a variation threshold). From the physical gestures that are similar, a default physical gesture can be generated. For example, the default physical gesture can represent the average of those physical gestures that are substantially similar.

In some implementations, default physical gestures are created in other ways. For example, a default physical gesture can represent a pre-defined gesture (e.g., generated programmatically or by the movement of a single user).

Default physical gestures can be used in various ways. For example, a default physical gesture can be provided as an option to the user (e.g., if the user does not want to configure their own physical gesture). A default physical gesture can also be provided if the user has trouble creating their own physical gesture.

In some implementations, the user is prompted to repeat the physical gesture one or more times. The user can be prompted to repeat the physical gesture to ensure that the user remembers the physical gesture and can repeat the movement in a similar enough manner that it will be recognized as the same physical gesture. In some implementations, when the user has trouble repeating the physical gesture (e.g., when the repeated physical gesture is not consistent with the original physical gesture associated with the command), the software application can revert to using an input control from a standard input device instead of the physical gesture (e.g., revert to using a keyboard key, mouse action, or game controller input).

In some implementations, a software application command is initiated by a combined input using a physical gesture and a control input using a standard input device. For example, a physical gesture can be received for performing a software application command. The software application command can also be associated with a control input using a standard input device (e.g., a default control input or a control input selected by the user). To illustrate operation of such a combination, consider a user that is setting up control input for throwing and detonating a grenade in a video game. The user can perform a physical gesture to throw the grenade and select a button on a controller to detonate the grenade. The combination of these two inputs (the physical gesture and the controller button) will perform the video game command of throwing and detonating the grenade.

Computing Systems

Figure 5:
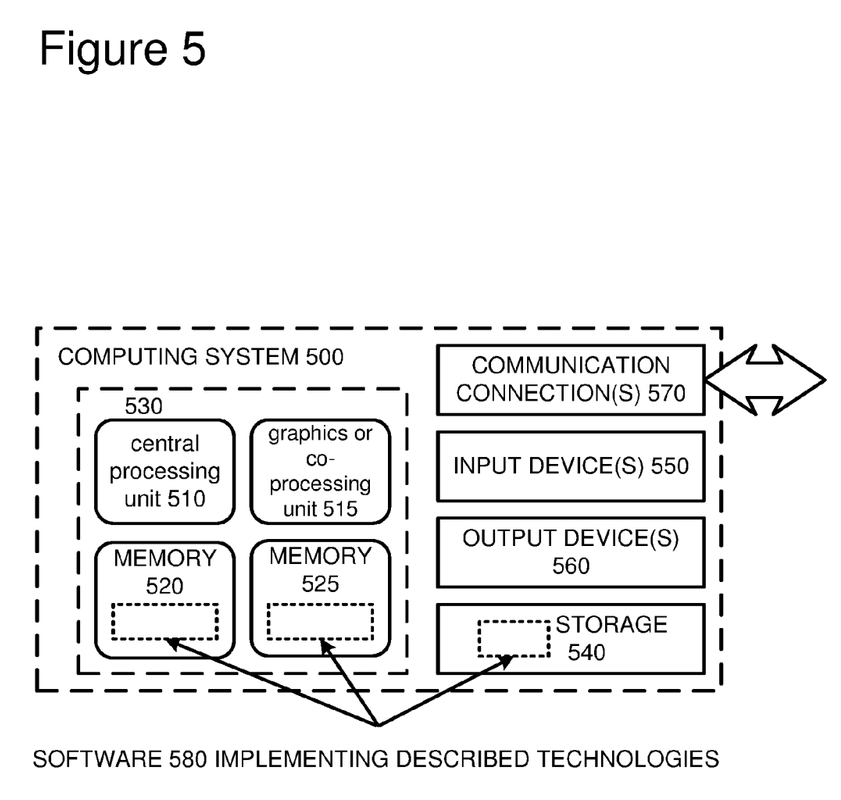
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are tangible media that can be accessed within a computing environment (one or more optical media discs such as DVD or CD, volatile memory components (such as DRAM or SRAM), or nonvolatile memory components (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections (e.g., 570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the computing device configured to perform operations for configuring user input using physical gestures, the operations comprising:
prompting a user to perform a physical gesture to assign to an identified software application command;
receiving, from the user via a physical gesture input device that uses one or more digital cameras, a physical gesture that is specific to the user, wherein the physical gesture is a representation of a movement of the user in three-dimensional space, and wherein the movement of the user is any desired movement without being restricted to a particular pre-defined movement;
associating the received physical gesture with the software application command, wherein performance of the physical gesture by the user initiates the software application command;

responsive to a request to repeat the physical gesture, receiving a repeated physical gesture from the user; and when the repeated physical gesture is not consistent with the received physical gesture, reverting to an input control from a standard input device to associate with the software application command, wherein the standard input device is one of a mouse, a keyboard, a touch device, or a game controller.

2. The computing device of claim 1 wherein the one or more digital cameras comprise one or more depth cameras.

3. The computing device of claim 1 wherein prompting a user to perform a physical gesture to assign to an identified software application command comprises:

outputting one or both of audio or visual instructions to the user, wherein the instructions:
request that the user perform the physical gesture; and
identify the software application command to which the physical gesture will be associated.

4. The computing device of claim 1, the operations further comprising:

receiving, from the user via the physical gesture input device, the physical gesture; and
in response to receiving the physical gesture, initiating the software application command.

5. The computing device of claim 1 wherein the software application command is assignable to a control input from one or more of a mouse, a keyboard, a touch device, or a game controller.

6. The computing device of claim 1 wherein software application command is a video game command.

7. The computing device of claim 6 wherein the computing device is a game console.

8. The computing device of claim 6 wherein the physical gesture input device uses one or more depth cameras, wherein the physical gesture is performed within an augmented reality environment, and wherein the video game command performs an in-game action within the augmented reality environment.

9. A method, implemented by a computing device, for configuring user input using physical gestures, the method comprising:

prompting a user to perform a physical gesture to assign to a video game command, wherein the video game command is also assignable to an input device action from one or more of a mouse, a keyboard, a touch device, or a game controller, comprising:
outputting a request that the user perform the physical gesture; and
identifying the video game command to which the physical gesture will be associated;
receiving, from the user via a physical gesture input device that uses one or more digital cameras, a physical gesture that is specific to the user, wherein the physical gesture is a representation of a movement of the user in three-dimensional space, and wherein the movement of the user is any desired movement without being restricted to a particular pre-defined movement;
associating the received physical gesture with the video game command, wherein performance of the physical gesture by the user initiates the video game command;
responsive to a request to repeat the physical gesture, receiving a repeated physical gesture from the user; and
when the repeated physical gesture is not consistent with the received physical gesture, reverting to an input control from a standard input device to associate with the video game command, wherein the standard input device is one of a mouse, a keyboard, a touch device, or a game controller.

10. The method claim 9, further comprising:
receiving, from the user via the physical gesture input device, the physical gesture; and
in response to receiving the physical gesture, initiating the video game command.

11. The method of claim 9, wherein the physical gesture input device uses one or more depth cameras.

12. The method of claim 9, wherein the video game command is an in-game action performed by the user's avatar within a first-person or third-person video game environment.

13. The method of claim 9, wherein the physical gesture input device uses one or more depth cameras, wherein the physical gesture is performed within an augmented reality environment, and wherein the video game command performs an in-game action within the augmented reality environment.

14. The method of claim 9, further comprising:
collecting one or more additional physical gestures from one or more other users for performing the video game command; and
upon determining that the one or more additional physical gestures represent similar movements to the physical gesture, generating a default physical gesture.

15. A computer-readable storage medium storing computer-executable instructions for causing a computing device to perform operations for configuring user input using physical gestures, the operations comprising:

prompting a user to perform a physical gesture to assign to an identified software application command;
receiving, from the user via a physical gesture input device that comprises one or more of a digital camera or a motion sensing device, a physical gesture that is specific to the user, wherein the physical gesture is a representation of a movement of the user in three-dimensional space, and wherein the movement of the user is any desired movement without being restricted to a particular pre-defined movement;
associating the received physical gesture with the software application command, wherein performance of the physical gesture by the user initiates the software application command;
responsive to a request to repeat the physical gesture, receiving a repeated physical gesture from the user; and
when the repeated physical gesture is not consistent with the received physical gesture, reverting to an input control from a standard input device to associate with the software application command, wherein the standard input device is one of a mouse, a keyboard, a touch device, or a game controller.

16. The computer-readable storage medium of claim 15, the operations further comprising:
prompting the user to perform a control input using a standard input device to assign to the identified software application command; and
receiving, from the user via the standard input device, the control input to use in combination with the received physical gesture to initiate the software application command;
wherein the standard input device is one of a mouse, a keyboard, a touch device, or a game controller.

17. The computer-readable storage medium of claim 16, the operations further comprising:

receiving, from the user via the physical gesture input device, the physical gesture;

receiving, from the user via the standard input device, the control input; and in response to receiving the physical gesture and the control input, initiating the software application command.

18. The computer-readable storage medium of claim 15 wherein prompting a user to perform a physical gesture to assign to an identified software application command comprises:

outputting one or both of audio or visual instructions to the user, wherein the instructions:
  request that the user perform the physical gesture; and
  identify the software application command to which the physical gesture will be associated.

19. The computer-readable storage medium of claim 15 wherein the software application command is assignable to a control input from one or more of a mouse, a keyboard, a touch device, or a game controller.

* * * * *